Patented Apr. 27, 1954

2,676,898

UNITED STATES PATENT OFFICE 2,676,898

METHOD OF TREATING GLASS FIBER BATS WITH RESIN AND PRODUCT

Charles J. Folger, Newark, and Richard M. Roberts, Granville, Ohio, assignors to Owens-Corning Fiberglas Corporation, Toledo, Ohio, a corporation of Delaware No Drawing. Application July 22, 1950, Serial No. 175,466

2 Claims. (Cl. 117—126)

This invention relates to removing a catalyst from a resin-forming reaction.

While the practice of the invention is not limited to a particular resin or class of resins, it especially contemplates thermosetting resinous polymers such as aldehyde condensation polymers, for instance, phenol formaldehyde. Accordingly, for purposes of illustration, the invention is particularly described in connection with such polymers.

The standard method of making these and other resins is to react the ingredients in a medium containing a catalyst. For example, in preparing phenol aldehyde polymers it is customary to use an alkaline medium, whereas in a urea formaldehyde type of polymer an acid medium may be used as a catalyst. Frequently it is desired to advance the polymeric growth only to an early stage, such as the "A" stage of polymerization where the resin is still water soluble. In this, or a similar form, the resin may be conveniently shipped in tank cars or the like to other stations where it may be applied for various purposes. After application the resin is converted to a final or "C" stage of polymerization.

One of the applications for an "A" stage type of polymer is as a binder for fibers, especially inorganic fibers, such as glass fibers. In this case, an aqueous solution of the polymer is sprayed on the fibers which may be arranged in a helter skelter, jack-straw fashion. The assembly is subsequently heated to evaporate the water and advance the polymer to the final stage. In so doing, the polymer formed at the junctures of the fibers adheres them one to another, thereby imparting a mass integrity and producing an integral fibrous mat or bat.

When polymers prepared in accordance with the conventional method are used as binders, several faults develop. For example, as a binder the polymer is spread substantially as a film between the contacting fiber surfaces. As a result, the surface area of the polymer is increased many thousand times as compared to when it is molded or shaped into a single integral article. Consequently the polymer in film form is considerably more susceptible to various agencies of attack.

One of these agencies to which the polymer is thus susceptible is the catalyst which is used to speed the reaction. Especially where the bonded fibrous mass is surrounded by conditions of high humidity, the catalyst tends to hydrolyze and attack the bond which then becomes rubbery. Particularly in the case of glass fibers bonded by a phenol aldehyde polymer which was catalyzed in an alkaline medium, this undesirable condition is further aggravated by the natural surface alkalinity of the glass itself.

The result is a gradual weakening of the bond until a substantial loss of mass integrity occurs wherein the fibrous mass may even disintegrate. In addition to this inability to withstand weathering, if the resin is cured while the fibrous mass is under compression, a subsequent destruction of the bond releases the compressed mass so that there is an actual swelling or expansion of the latter which accompanies the loss of mass integrity.

One method that has been used in an attempt to avoid these shortcomings is to precipitate the catalyst at a desired point in the polymeric growth of the resin. For example, in the "A" stage of a phenol aldehyde reaction, an acid such as phosphoric acid has been added to precipitate the alkaline catalyst as salts which are then filtered from the solution. Such an operation is time consuming and involves an appreciable expenditure of labor, particularly when large quantities are to be processed such as in tank car lots. Further, this procedure has been found to be inefficient so that some of the alkali material still remains, subsequently to attack the bond.

The principal object of the invention is to provide a method of removing a catalyst from a resin-forming reaction.

Another object is to provide an improved method of making an aldehyde condensation polymer.

A further object is to provide a resinous binder for fibrous matter which is less susceptible to alkali attack.

A still further object is to provide a resinous binder for fibrous matter wherein the latter is less subject to swelling and disintegration.

More specific objects and advantages are apparent from the following description which merely discloses and illustrates the invention and is not intended to limit the claims.

The objects of the invention are realized by removing the catalyst from a resin-forming reaction by converting it to a neutral, soluble product.

The mechanics of the invention are thus applicable to any type of resin or polymer formation since the invention deals with treatment of the catalyst independently of main chemical reaction which results in the resin or polymer. However, the invention is chiefly used in the case of thermosetting polymeric resins because these are predominantly employed as binders for fibrous matter. In particular, aldehyde condensation polymers such as phenol formaldehyde are frequently so employed. Other aldehyde condensation polymers contemplated include those obtained by reacting phenol, resorcinol, furfuryl, cresols, xylenols, urea, and melamine with formaldehyde or paraformaldehyde.

In the ordinary case the conversion of the catalyst to a soluble, neutral form is accomplished by the addition of a neutralizer. Thus, an acidic catalyst may be neutralized by an alkaline additive, or, as is more often the case, an alkaline catalyst may be neutralized by an acidic additive.

Strong inorganic bases and acids are well adapted to this purpose. For instance, an alkaline catalyst such as sodium, potassium, calcium or lithium hydroxide may be neutralized by an acidic additive such as hydrochloric, sulfuric, or nitric acid to form a neutral, soluble salt.

However, other reactants may be used as well. For example, a basic salt such as sodium or potassium carbonate may be used as a catalyst and neutralized by the cited acids. In this case, carbon dioxide gas is formed from the heat subsequently applied to advance the polymer to the "C" stage, which causes the reaction in which the catalyst is involved to go to completion.

In the same manner, the cited bases may be used with acid salts such as ammonium chloride, sulfate, or nitrate. Here, ammonia gas is liberated by the heat in the base-acid salt reaction causing this reaction to go to completion and perform the functions intended by the present invention. In addition, the mentioned acid-basic salts may be used to neutralize each other when heat is subsequently applied as described.

In all cases, the choice of a particular catalyst for a given resin-forming reaction as well as the choice of a catalyst neutralizer capable of forming a soluble product therewith are matters of common chemical knowledge readily apparent and available to those skilled in the art.

While it is preferable that the neutral salt formed as described be heat stable, this is not essential in practicing the invention. Ordinarily, the polymer used as a glass fiber binder is advanced to the final "C" stage at about 350° F. and it is accordingly desirable that the neutral salt withstand this temperature without harmful decomposition. However, the final polymeric growth may be effected at lower temperatures if necessary, for instance, at slightly elevated room temperature.

By a soluble product or soluble salt with respect to the catalyst reaction is meant one that is soluble in the medium used. In most cases this is water which in turn means that the catalyst removal must be effected while the resin polymer is in the "A" stage or still water-soluble. However it is possible to wait until the "B" or oil soluble stage where the medium may be an organic solvent such as alcohol. Here the acid salt neutralizer may be added as a powder if desired.

Many combinations are possible. However, illustrative of the invention are the following examples:

*Example I*

A procedure was carried out in which phenol was reacted with formaldehyde in the molar ratio 1:2.2, respectively. The catalyst was sodium hydroxide and was present in the amount of 2.5% based on weight of phenol. Ordinarily, the amount of catalyst may range from 1 to 5%. After being heated for two hours at 160° F. to 170° F. the mixture was cooled to 140° F. to 150° F. At this point, heating continued until a desired end point was reached as conventionally determined by water tolerance, specific gravity and refractive index.

The resin was then neutralized with a 1:1 water solution of sulfuric acid to a pH of 7.5 as determined by conventional pH meter.

Subsequently, the resin was sprayed on a bat of glass fibers arranged in a helter-skelter, jackstraw pattern and then advanced to the final or "C" stage of polymerization by heat. The resulting bond showed excellent resistance to attack from alkalies even in atmospheres of high humidity. Further, when the resin was cured while the bat was under compression, there was no subsequent swelling or expansion of the bat under conditions which heretofore caused destruction of the resin bond.

*Example II*

A procedure was carried out that was similar to the procedure of Example I except that meta-cresol was reacted with formaldehyde in the molar ratio of 1:2.5, respectively. The catalyst was calcium hydroxide and was present in an amount of 3.5% based on the weight of the cresol. The hydroxide was neutralized with hydrochloric acid.

*Example III*

A procedure was carried out that was similar to the procedure of Example I except that 3-5 xylenol was reacted with formaldehyde in the molar ratio of 1:2, respectively. The catalyst was sodium carbonate and was present in the amount of 4% based on the weight of xylenol. It was neutralized with nitric acid.

*Example IV*

A procedure was carried out that was similar to the procedure of Example I except that para-cresol was reacted with formaldehyde in the molar ratio of 1:2.7, respectively. The catalyst was potassium hydroxide and was present in the amount of 2.8% based on the weight of the cresol. The hydroxide was neutralized with hydrochloric acid.

*Example V*

A procedure was carried out that was similar to the procedure of Example I except that urea was reacted with formaldehyde in the molar ratio of 1.2:2, respectively. The catalyst was hydrochloric acid which was present in the amount of 2.5% based on the weight of the urea. The acid was neutralized with sodium hydroxide.

Resinous binders prepared in accordance with the present invention need not be filtered to remove any precipitate thereby saving time and expense. The presence of the neutral salt does not have any detrimental effect. In fact, glass wool bonded with phenol formaldehyde prepared in accordance with the present invention has exhibited improved resistance to alkali attack as compared to glass wool bonded with conventionally prepared phenol formaldehyde. The bonds of glass fibers bonded with the present resins also do not disintegrate nearly so easily and there is, subsequently, little or no swelling of the fibrous mass during storage or while in use.

Various changes and modifications may be made within the spirit and scope of the disclosure and appended claims.

We claim:

1. A method of bonding glass fibers, arranged in a helter-skelter fashion, one to another at their intersections to form an integral bat consisting of: catalyzing a phenol aldehyde polymerization reaction to the "A" stage, neutralizing the catalyst with a reactant, spraying the "A" stage polymer onto the fibers, and advancing the polymer to the "C" stage by heating to form a dried deposit comprising both the phenol aldehyde resin and the salt formed by neutralizing said catalyst with said reactant, said catalyst being an alkaline material selected from the group consisting of sodium hydroxide, potassium hydroxide, calcium hydroxide, lithium hydroxide, sodium carbonate, and potassium carbonate, and said reactant being an acidic material selected from the group consisting of hydrochloric acid, sulfuric acid, nitric acid, ammonium chloride, ammonium sulfate, and ammonium nitrate.

2. A fiber bat having improved resistance to alkalinity attack consisting essentially of glass fibers arranged in helter-skelter fashion and bound one to another at their intersections by a phenol aldehyde resin formed in the presence of an alkaline catalyst selected from the group consisting of sodium hydroxide, potassium hydroxide, calcium hydroxide, lithium hydroxide, sodium carbonate and potassium carbonate, said phenol aldehyde resin containing the dried deposit of the salt formed by the acid neutralization of said catalyst with an acidic material selected from the group consisting of hydrochloric acid, sulphuric acid, nitric acid, ammonium chloride, ammonium sulphate and ammonium nitrate.

References Cited in the file of this patent

UNITED STATES PATENTS

| Number | Name | Date |
| --- | --- | --- |
| 1,222,980 | Ornstein | Apr. 17, 1917 |
| 1,858,168 | Ostersetzer et al. | May 10, 1932 |
| 1,960,116 | Loos | May 22, 1934 |
| 2,140,981 | Booty et al. | Dec. 20, 1938 |
| 2,252,157 | Bergin et al. | Aug. 12, 1941 |
| 2,305,417 | Hansen | Dec. 15, 1942 |
| 2,325,302 | Britt | July 27, 1943 |
| 2,349,909 | Meharg | May 30, 1944 |
| 2,493,194 | Neino | Jan. 5, 1950 |